(12) United States Patent
Tse

(10) Patent No.: US 6,409,469 B1
(45) Date of Patent: Jun. 25, 2002

(54) FAN-STATOR INTERACTION TONE REDUCTION

(75) Inventor: Man-Chun Tse, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 7 days.

(21) Appl. No.: 09/716,454

(22) Filed: Nov. 21, 2000

(51) Int. Cl.⁷ .............................. F01D 5/10; F04D 29/38
(52) U.S. Cl. ........................ 415/119; 415/1; 415/115; 415/914
(58) Field of Search .................... 415/119, 1, 199.4, 415/199.5, 914, 26, 47, 115; 244/1 N; 416/DIG. 2, 90 R, 91, 92; 381/71

(56) References Cited

U.S. PATENT DOCUMENTS

| | | | |
|---|---|---|---|
| 3,937,590 A | 2/1976 | Mani | 415/119 |
| 4,104,002 A | 8/1978 | Ehrich | 415/119 |
| 4,255,083 A | * 3/1981 | Andre et al. | 415/119 |
| 4,692,091 A | 9/1987 | Ritenour | 415/119 |
| 5,169,288 A | 12/1992 | Gliebe et al. | 415/119 |
| 5,515,444 A | 5/1996 | Burdisso et al. | |
| 5,707,206 A | * 1/1998 | Goto et al. | 415/173.1 |
| 5,709,529 A | 1/1998 | Parzych | 415/119 |
| 5,833,433 A | * 11/1998 | May et al. | 415/115 |
| 6,004,095 A | * 12/1999 | Waitz et al. | 415/115 |

FOREIGN PATENT DOCUMENTS

DE 19527452 A1 * 1/1997

* cited by examiner

*Primary Examiner*—F. Daniel Lopez
*Assistant Examiner*—Richard Woo
(74) *Attorney, Agent, or Firm*—Todd D. Bailey

(57) ABSTRACT

A gas turbine engine rotor assembly such as a fan or compressor includes fan blades spaced axially from stator vanes inside an annular duct. A controlled air blowing system is secured to the annular duct and adapted to blow a hot air flow in a direction opposite to the rotation of the fan blades into the annular duct between the fan blades and the stator vanes, to impart an opposite rotational momentum with respect to the air compressed by the rotor blades, in a asymmetrical pattern to interfere with or destroy a symmetrical pattern of the blade rotation-wake of the compressed air, thereby reducing the strength or preventing the generation of the spinning mode so that the fan-stator interaction tones are significantly reduced.

14 Claims, 4 Drawing Sheets

FAN-STATOR INTERACTION TONE REDUCTION

FIELD OF THE INVENTION

The present invention relates generally to gas turbine engines. More specifically, this invention relates to a system for improved attenuation of the noise generated by the interaction of rotor blades and stationary guide vanes in gas turbine engines.

BACKGROUND OF THE INVENTION

Noise has been a significant negative factor associated with the commercial airline industry since the introduction of the aircraft gas turbine engine. Considerable effort has been directed toward quieting aircraft engines. The aerodynamic interaction of rotor blades and stationary guide vane wakes adds a significant contribution to the noise produced by the jet engine. Fans and compressors include at least one row of a plurality of circumferentially spaced apart rotor blades for compressing air channeled therethrough, and a row of circumferentially spaced apart stator vanes axially spaced apart from the rotor blades. The rotor blades rotate about a longitudinal centerline axis of the engine at a rotational speed and effect a tonal noise at a blade passing frequency (BPF). Interaction tones are generated in the region between the rotor blades and the stator vanes, within the annular duct surrounding the blades and the vanes, conventionally known as spinning modes.

The blade rotation-wakes of the air compressed by the fan blades form rotational pressure fields and impinge on the stator vanes, thereby creating the spinning mode tones. The spinning mode tones occur at discrete frequencies including the fundamental blade passing frequency BPF, alternatively referred to herein as the first harmonic, and higher order frequencies including the second, third and higher harmonics. When this spinning mode rotational speed is fast enough to cause the local Mach number to be greater than about 1.1, the spinning mode tones will propagate outside, either upstream through the duct inlet or downstream through the duct outlet, or both, enhancing BPF tone levels generated directly by the rotor blades.

In order to reduce the spinning mode noises, at takeoff or landing approach for example, it is known in the art to direct the spinning mode tones to impinge on the walls of the interior of the engine, which is lined with a sound absorbent material. This technique causes the spinning mode tones to decay before exiting the engine, examples of which are described in U.S. Pat. No. 3,937,590 issued to Mani on Feb. 10, 1976 and U.S. Pat. No. 4,104,002 issued to Ehrich on Aug. 1, 1978. However, acoustical wall treatment has only made small reductions in fan inlet noise levels and this is compounded by inlet length-to-radius ratios becoming smaller.

In U.S. Pat. No. 4,300,656 issued to Burcham on Nov. 17, 1981, Burcham describes an acoustic noise elimination assembly having the capability to disrupt the continuity of rotating fields of sound pressures forwardly projected from fans or rotors of a type commonly found in the front or compressor first stage of air-breathing engines, when operating at tip speeds in the supersonic range. The assembly includes a tubular cowl defining a duct for delivering an air stream axially into the intake of a jet engine and a sound barrier, defined by a plurality of intersecting flat plates or struts having a line of intersection coincident with a longitudinal axis of the tubular cowl which serves to disrupt the continuity of rotating fields of multiple tonal components of noise.

Reduction of the spinning mode noise can be achieved by reduction of the production processes at the source of the noise which reduces the incident aerodynamic unsteadiness or the mode generation from such interactions. It is conventionally known to select the number of vanes and the number of blades to create a spinning mode propagation cut-off phenomenon. For example, Gliebe et al. describe a low noise fan assembly in their U.S. Pat. No. 5,169,288 issued on Dec. 8, 1992, and suggest that the number of vanes is selected for a predetermined number of blades for obtaining substantially equal values of a cut-off ratio for at least two blade passing frequency harmonics for reducing spinning mode noise from the fan assembly. In practice, for the spinning mode propagation cut-off a number V of vanes and a number B of blades are selected to achieve $V \geq 2.3B$. In some designs, however, particularly in high by-pass turbofan engines requiring a relatively large number of rotor blades, a cut-on fan-stator ($V<2B$) may be selected in order to find a compromise with other design criteria. In such cases the spinning mode is always cut-on, resulting in increasing the BPF tone level. Therefore, there is a need for an alternative solution to prevent spinning mode generation.

SUMMARY OF THE INVENTION

It is one object of the present invention to provide a method of reducing rotor-stator interaction tone noise in fans and compressors.

Another object of the present invention is to provide a method of inhibiting spinning mode tone propagation to reduce tone noise levels of fans or compressors.

Yet another object of the present invention is to provide a method of inhibiting generation of a spinning mode in fans and compressors to reduce tone noise levels thereof.

A further object of the present invention is to provide an improved fan or compressor assembly effective for reducing BPF tone and harmonics.

In accordance with one aspect of the present invention, a method is provided for reducing rotor-stator interaction tones in an annular duct surrounding a plurality of circumferentially spaced rotor blades and a plurality of circumferentially spaced stator vanes axially spaced apart from the rotor blades, the annular duct including an inlet for receiving air and an outlet for discharging at least a portion of the air compressed by the rotor blades. The method comprises a step of providing a controlled air blowing system for blowing an air flow in a direction opposite to the rotation of blade-wakes into the annular duct between the rotor blades and the stator vanes to impart an opposite rotational momentum with respect to the air compressed by the rotor blades, thereby reducing the strength of a spinning mode generated by a symmetrical pattern of the blade rotation-wake of the compressed air.

It is preferable to blow in a hot air flow to increase the temperature of the compressed air, thereby increasing a local sound speed when sound waves propagate in the air medium. It is also preferable to blow the air flow asymmetrically into the annular duct to destroy the symmetrical blade rotation-wake pattern, thereby preventing the generation of the spinning mode.

In accordance with another aspect of the present invention, a gas turbine engine fan assembly comprises a plurality of circumferentially spaced rotor blades and a plurality of circumferentially spaced stator vanes axially spaced apart from the rotor blades. An annular duct surrounds the rotor blades and stator vanes, and has an inlet for receiving air and an outlet for discharging at least a portion of the air upon compression by the blades. Means are provided for blowing an air flow in a direction opposite to the rotation of the rotor-blade wakes into the annular duct between the rotor blades and the stator vanes to impart an opposite rotational momentum with respect to the air compressed by the rotor blades, thereby reducing the strength of a spinning mode generated by a symmetrical pattern of the blade rotation-wakes of the compressed air.

The means preferably include a plurality of nozzles in an outer wall of the annular duct and the nozzles are connected to a compressed air source of the gas turbine engine for controllably blowing the air flow. It is preferable that the nozzles are circumferentially spaced apart in an asymmetrical pattern to blow the air flow asymmetrically into the annular duct to destroy the symmetrical blade rotation-wake pattern, thereby preventing the generation of the spinning mode. It is also preferable that each of the nozzles is oriented in a transverse cross-section, angularly with respect to a diametrical line of the annular duct passing the nozzle so that the air flow is adapted to controllably penetrate a radial distance ranging from 5% to 20% of a length of the fan radius when the means are in operation.

The present invention provides a solution effective for source reduction of rotor-stator interaction tone noises of a gas turbine engine fan assembly to significantly reduce the fan tone level. Other advantages and features of the invention will be better understood with reference to a preferred embodiment described below.

BRIEF DESCRIPTION OF THE DRAWINGS

Having thus generally described the nature of the invention, reference will now be made to the accompanying drawings by way of illustration showing the preferred embodiments in which.

DETAILED DESCRIPTION OF THE PREFERRED EMBODIMENTS

Figure 1:
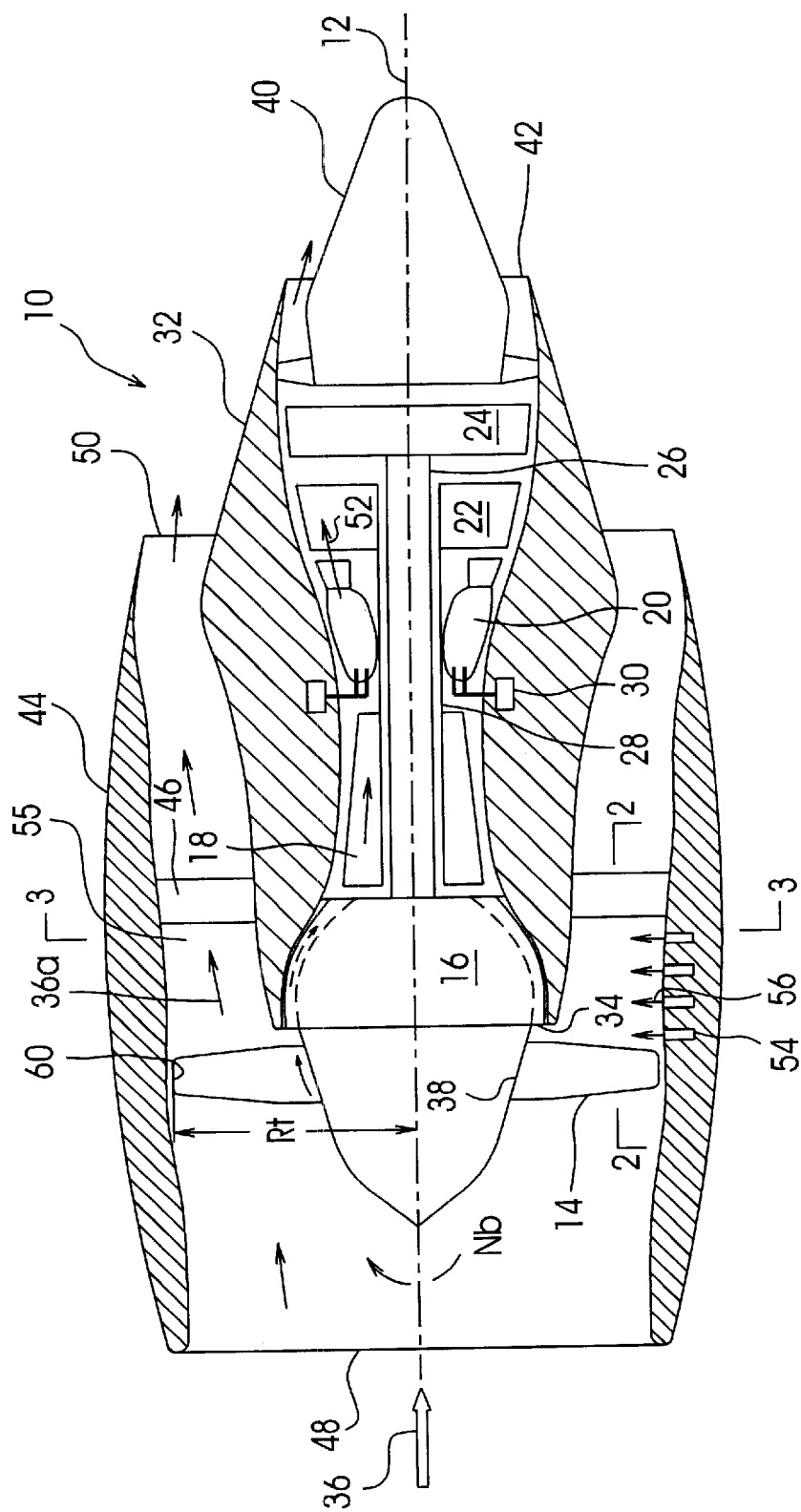
FIG. 1 is a longitudinal sectional schematic view of an exemplary gas turbine engine having a fan assembly incorporating the present invention.

Referring to the drawings, particularly FIG. 1, an exemplary gas turbine engine 10 includes in serial flow communication about a longitudinal centerline axis 12, a fan having a plurality of circumferentially spaced apart fan, or rotor blades 14, a conventional low pressure compressor 16, a conventional high pressure compressor 18, a conventional annular combustor 20, a conventional high pressure turbine 22 and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. Conventional fuel injecting means 30 are provided for selectively injecting fuel into the combustor 20 for powering the engine 10.

A conventional annular casing 32 surrounds the engine 10 from the low pressure compressor 16 to the low pressure turbine 24, and defines, with the low pressure compressor 16, a low pressure compressor inlet 34 for receiving a portion of ambient air 36 thereof. The downstream end of the casing 32 defines with a conventional annular exhaust plug 40 an annular exhaust outlet 42. A portion of the air 36 compressed by the fan blades 14 adjacent to the blade roots 38 are further compressed by the low pressure compressor 16 and the high pressure compressor 18 and forced into the combustor 20. The mixture of the compressed air 36 and the fuel injected by the fuel injecting means 30 generate combustion gases 52. The combustion gases 52 cause the high pressure turbine 22 and the low pressure turbine 24 to rotate respectively for powering the high pressure compressor 18, low pressure compressor 16 and the fan blades 14.

Surrounding the blades 14 and the upstream portion of the casing 32 is a nacelle 44 which is spaced radially outwardly from the casing 32 to define with the casing 32 an annular duct 55 for permitting the radially outer portion of the air 36 compressed by the blades 14 to bypass the engine. For convenient description, this bypass air flow is indicated by 36a as shown in FIG. 1. A plurality of circumferentially spaced stator vanes 46 extend radially between the casing 32 and the nacelle 44, and are spaced apart axially downstream from the blades 14. The nacelle 44 includes an inlet 48 at its upstream end for receiving the ambient air 36, and an outlet 50 for discharging the portion of the air 36 compressed by the blades 14 and past the stator vanes 46 for providing a portion of a thrust.

Figure 2A:
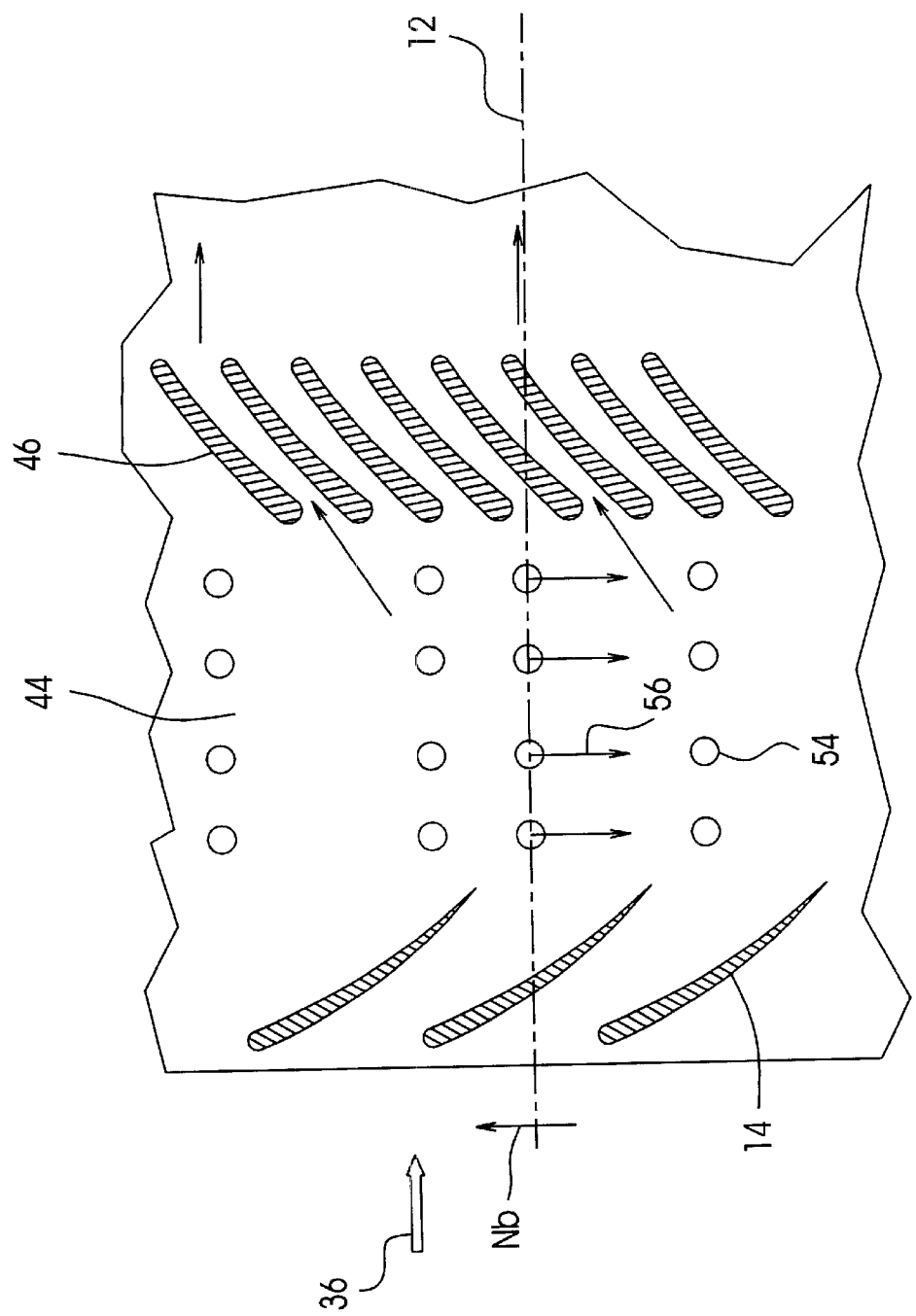
FIG. 2a is a radial sectional view of a portion of the fan assembly illustrated in FIG. 1 taken along line 2—2 showing an array of nozzles according to one embodiment of the present invention.

During operation of the engine 10, air 36 enters the inlet 48 and passes the fan blades 14, which is caused by both the aircraft movement and the suction generated by the rotating fan blades 14. The air flow 36a passing the rotating fan blades 14 effects a blade passing frequency BPF noise which is a product of the rotational speed Nb and the number B of the fan blades 14. The air flow 36a compressed by the fan blades 14 and passing the stator vanes 46, under the fan-stator flow interaction, generates spinning mode tones, resulting in increasing the BPF tone level and higher harmonics thereof. In order to significantly reduce the BPF tone level and higher harmonics thereof, a controlled air blowing system including a plurality of nozzles 54 in the wall of the nacelle 44 is provided for blowing an air flow 56 in a direction opposite to the rotational speed Nb of the fan blades 14 into the annular duct 55 between the fan blades 14 and the stator vanes 46, more clearly shown in FIGS. 2a–3, to impart an opposite rotational momentum with respect to the air compressed by the fan blades 14, thereby reducing the fan-wake rotational speed, resulting in reducing the spinning mode strength shown in FIG. 4, generated by a symmetrical blade rotation-wake of the compressed air.

The nozzles 54 are connected to a compressed air source of the gas turbine engine, such as bleed-off air from an inter-stage compressor (not shown) and control mechanism (not shown) for controllably blowing the air flow. The nozzles 54 are axially spaced apart from one another to form rows extending axially from the fan blades 14 to the stator vanes 46. One embodiment of the present invention shown in FIG. 2a includes an array of the nozzles 54 including circumferentially spaced rows extending between the fan blades 14 and the stator vanes 46, each row including a number of the nozzles 54 axially spaced apart from one another and located along the entire axial length of the space between the fan blades 14 and the stator vanes 46. The nozzle rows are circumferentially spaced apart from one another unevenly in an asymmetrical pattern so that the air flow 56 blown from the nozzles 54 is in an asymmetrical pattern.

Figure 2B:
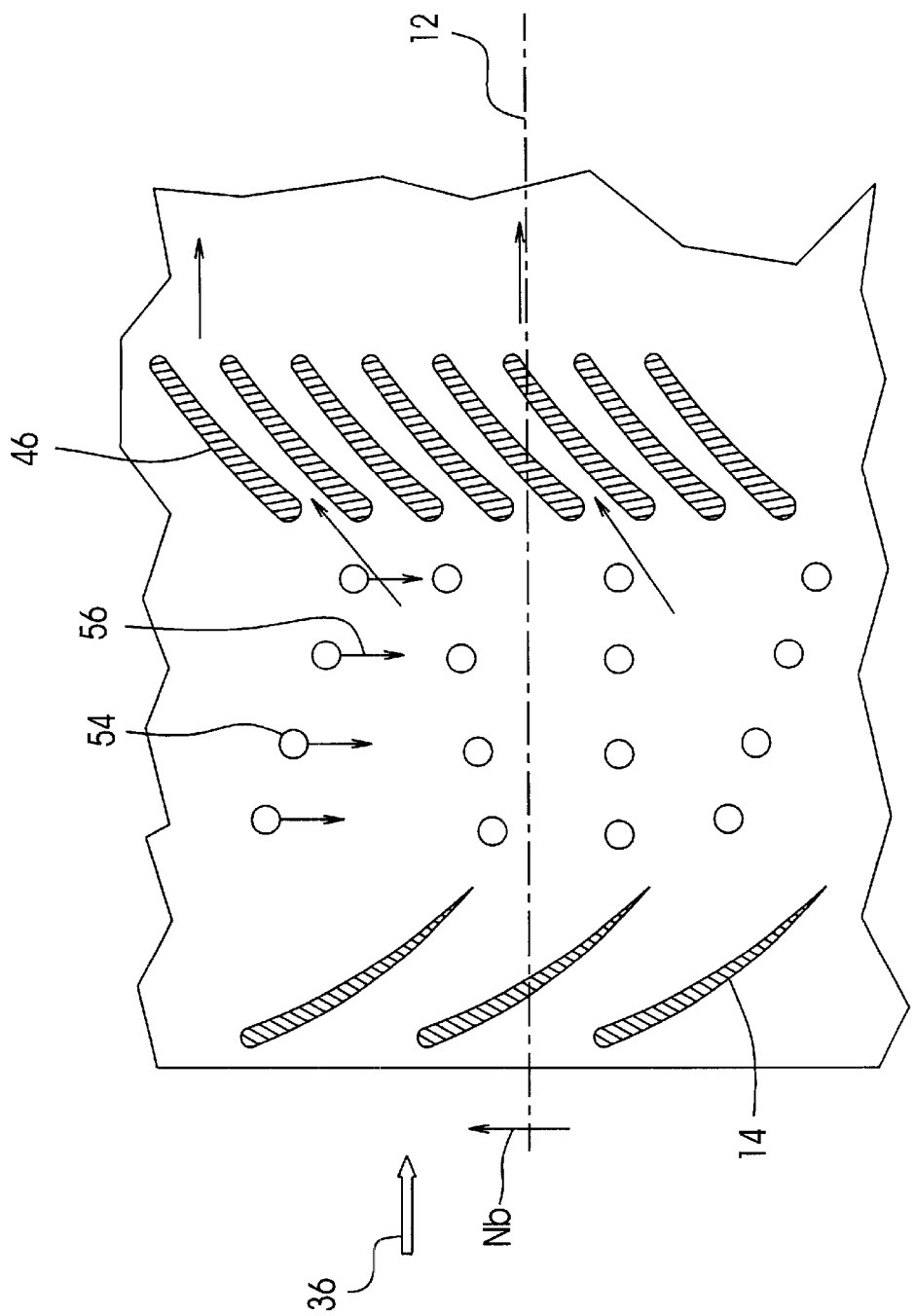
FIG. 2b is a view similar to FIG. 2a, showing an array of nozzles according to an alternative embodiment of the present invention.

FIG. 2b illustrates another embodiment of the present invention, wherein the array of the nozzles 54 includes rows having different orientations. For example, the third row of the nozzles 54 from the top to the bottom shown in FIG. 2b extends axially and the first and the fourth rows of the nozzles 54 are oriented angularly in one direction with respect to the axial direction while the second row of the nozzles is oriented angularly in a different direction with respect to the axial direction. In such an arrangement the asymmetrical effect produced by the air flow 56 blown from the nozzles 54 is strengthened.

Figure 3:
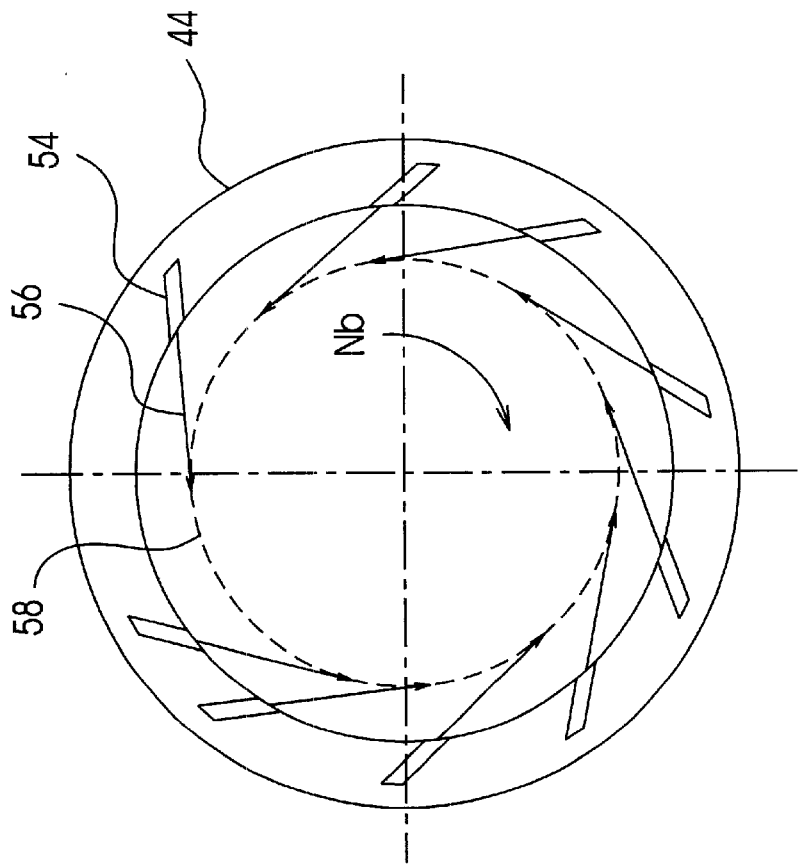
FIG. 3 is a cross-sectional view of FIG. 1 taken along line 3—3, showing the nozzles in the outer wall of the annular duct of the fan assembly.

In all the embodiments of the present invention, each of the nozzles 54 is oriented in a transverse cross-section as shown in FIG. 3, angularly to a diametrical line of the nacelle 44 passing the nozzle. Preferably each of the nozzles 54 is oriented tangentially with respect to an imaginary circle 58 which has a radius equal to about 80% of the fan radius $R_t$ that is defined by the radius from the centerline axis 12 to the fan blade tip 60 as shown in FIG. 1, so that the air flow radially penetrates an outer annular region of the annular duct 55 up to about 20% of the fan radius $R_t$. Of course, the outer annular region which the air flow 56 penetrates is reduced when the velocity of the air flow 56 is reduced. Nevertheless, it is suggested that the air flow strength should sufficiently penetrate an outer annular region of the annular duct 55 to an extent at least 5% of the fan radius $R_t$ in order to effectively reduce the BPF tone level and higher order of harmonics. In practice, the nozzles 54 may be slightly angled in an axial direction opposite to the compressed air flow 36a. However, the angle in the axial direction will cause thrust loss and therefore the angle should be limited to a small degree.

Figure 4:
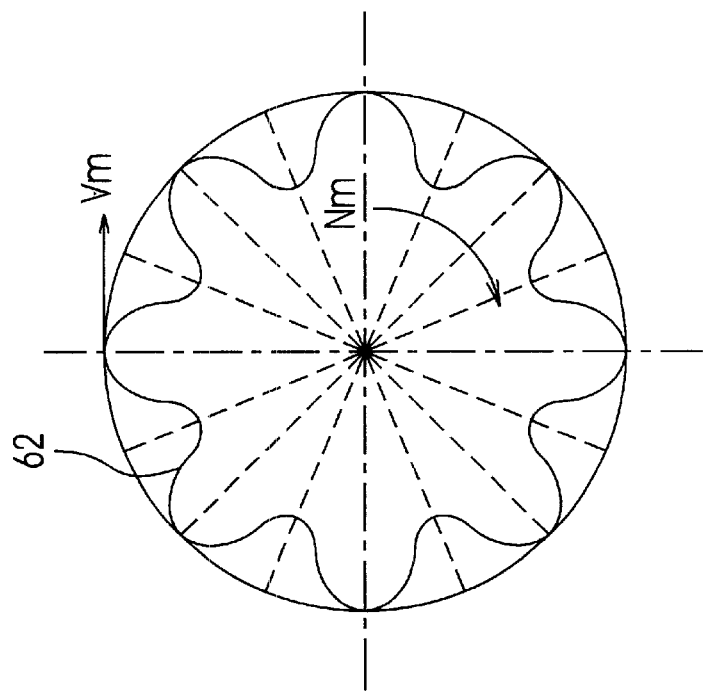
FIG. 4 is a schematic view showing the spinning mode generated by the blade rotation-wake pattern in the fan assembly.

The principle of the present invention is explained with details as below. An exemplary spinning mode is schematically illustrated in FIG. 4. The spinning mode 62 represents a rotating and fluctuating pressure field in a symmetrical pattern generated by the fan-stator interaction resulting from a symmetrical rotation-wake of the air compressed by the fan blades 14 impinging on the stator vanes 46. The spinning mode generates tone noise at the fundamental BPF tone and higher harmonics. When this spinning mode rotational speed Nm exceeds a certain extent making the local Mach number M greater than about 1.1, the spinning mode noise will propagate outside, both at the upstream inlet 48 and the downstream outlet 50. The local Mach number M is described by the following equation:

$$M=V_m/a$$

wherein:
  a is a sound speed in the local sound propagation medium, and
  $V_m$ is the maximum tangential speed of the rotational spinning mode 62 and is proportional to the spinning mode rotational speed $N_m$,
  i.e., $V_m = R_t \cdot N_m$.

The spinning mode rotational speed $N_m$ is also proportional to the rotational speed $N_b$ of the fan blades 14, which may be represented by the following equation:

$$N_m=(nB/m)N_b$$

wherein:
  B is the number of the fan blades 14,
  n is the blade passing frequency harmonic integer number, and
  m is the spinning mode number determined by an equation as follows:

$$m=nB+kV$$

wherein:
  V is the number of the stator vanes 46, and
  k is an index number that may take on all positive and negative integers, including zero as an integer.

From the above equations it is apparent that when the engine operation condition is certain, i.e. $N_b$ unchanged, a proper selection of the number B and V will affect the spinning mode speed $N_m$, resulting in a change of the local Mach number M. Based on this principle, the prior art spinning mode propagation cut-off technology is developed. However, this analysis is based on a precondition in which the air flow 36a compressed by the fan blades 14 is not interfered with by the air flow 56. In the case of the air flow 56 blown into the annular duct 55 between the fan blades 14 and the stator vanes 46 in a direction opposite to the rotational speed $N_b$ of the fan blades 14, the air flow 56 imparts an opposite rotational momentum to the air flow 36a compressed by the fan blades 14, thereby directly reducing the strength of the spinning mode, and also reducing the local Mach number M. If the opposite rotational momentum imparted by the air flow 56 is great enough, the generation of the spinning mode will be prevented.

More importantly, the air flow 56 is blown into the annular duct 55 in an asymmetrical pattern which interferes with the symmetrical rotation-wake pattern of the air flow 36a compressed by the fan blades. If the asymmetrical pattern of the air flow 56 is strong enough to destroy the symmetrical rotation-wake pattern, the generation of the spinning mode 62 will be more effectively prevented. Therefore, the fan BPF tone of the gas engine 10 is significantly reduced because the generation of fan-stator interaction tone is minimized or prevented.

From the above analysis, it is further known that the local Mach number M may decrease if the local sound speed "a" increases. It is also known that the sound propagation speed "a" will increase when the temperature of the medium to propagate the sound waves increases. Therefore, it is preferable to increase the temperature of the local medium, i.e. the air in the annular duct 55, by blowing a hot air flow 56 which has a temperature much greater than the temperature of the ambient air 36, thereby reducing the local Mach number M to a value smaller than about 1.1 to cut off the fan noise propagation.

Modifications and improvements to the above-described embodiments of the present invention may become apparent to those skilled in the art. The forgoing description is intended to be exemplary rather than limiting. The scope of the present invention is therefore intended to be limited solely by the scope of the appended claims.

What is claimed is:

1. A method for reducing rotor-stator interaction tones in an annular duct surrounding a plurality of circumferentially spaced rotor blades and a plurality of circumferentially spaced stator vanes axially spaced apart from the rotor blades, the annular duct including an inlet for receiving air and an outlet for discharging at least a portion of the air compressed by the rotor blades, comprising a step of proving a controlled air blowing system for blowing an air flow in a direction opposite to the rotation of blade-wakes into the annular duct between the rotor blades and the stator vanes to impart an opposite rotational momentum with respect to the air compressed by the rotor blades, thereby reducing the strength of a spinning mode generated by a symmetrical pattern of the blade rotation-wakes of the compressed air.

2. A method as claimed in claim 1 wherein the air flow has a temperature higher than a temperature of the compressed air to increase a local sound speed.

3. A method as claimed in claim 2 wherein the higher temperature air flow is blown to the annular duct to make a local Mach number smaller than 1.1.

4. A method as claimed in claim 1 wherein the air flow is asymmetrically blown into the annular duct to destroy the symmetrical blade rotation-wake pattern, thereby preventing the generation of the spinning mode.

5. A method as claimed in claim 1 comprising a step of providing a plurality of nozzles in an outer wall of the annular duct to blow the air flow penetrating a radial distance ranging from 5% to 20% of a length from a tip of the rotor blades to a rotational axis of the rotor blades.

6. A gas turbine engine fan assembly comprising:

a plurality of circumferentially spaced rotor blades;

a plurality of circumferentially spaced stator vanes axially spaced apart from the rotor blades;

an annular duct surrounding the rotor blades and stator vanes, and having an inlet for receiving air and an outlet for discharging at least a portion of the air upon compression by the blades; and means for blowing an air flow in a direction opposite to the rotation of blade-wakes into the annular duct between the rotor blades and the stator vanes to impart an opposite rotational momentum with respect to the air compressed by the rotor blades, thereby reducing the strength of a spinning mode generated by a symmetrical pattern of the blade rotation-wakes of the compressed air.

7. A fan assembly as claimed in claim 6 wherein means for blowing an air flow is adapted for blowing an air flow having a temperature higher than a temperature of the compressed air to increase a local sound speed.

8. A fan assembly as claimed in claim 6 wherein the means include a plurality of nozzles in an outer wall of the annular duct, the nozzles being connected to a compressed air source of the gas turbine engine for controllably blowing the air flow.

9. A fan assembly as claimed in claim 6 wherein the nozzles are circumferentially spaced apart in an asymmetrical pattern to blow the air flow asymmetrically into the annular duct to destroy the symmetrical blade rotation-wake pattern, thereby preventing the generation of the spinning mode.

10. A fan assembly as claimed in claim 6 wherein each of the nozzles is oriented in a transverse cross section angularly with respect to a diametrical line of the annular duct passing the nozzle so that the air flow is adapted to controllably penetrate a radial distance ranging from 5% to 20% of a length of a fan radius when the means are in operation.

11. A fan assembly as claimed in claim 6 wherein at least a number of the nozzles are axially spaced apart from one another and form a row extending axially from the rotor blades to the stator vanes.

12. A fan assembly as claimed in claim 6 wherein the nozzles are arranged in an array including circumferentially spaced rows extending between the rotor blades and the stator vanes, each row including a number of the nozzles axially spaced apart from one another.

13. A fan assembly as claimed in claim 6 wherein the nozzle rows are asymmetrically located along the circumference of the outer wall of the annular duct.

14. A fan assembly as claimed in claim 6 wherein the nozzle array includes at least one row oriented angularly with respect to an axial direction of the fan assembly.

* * * * *